United States Patent [19]

Scagnelli et al.

[11] Patent Number: 5,415,416
[45] Date of Patent: May 16, 1995

[54] COMPUTERIZED LOTTERY WAGERING SYSTEM

[75] Inventors: John B. Scagnelli, Holmdel; Joseph A. Fiscella, Maywood, both of N.J.

[73] Assignee: Lottotron Inc., Hackensack, N.J.

[21] Appl. No.: 181,361

[22] Filed: Jan. 13, 1994

Related U.S. Application Data

[63] Continuation of Ser. No. 4,633, Jan. 12, 1993, abandoned, which is a continuation of Ser. No. 489,814, Mar. 6, 1990, abandoned.

[51] Int. Cl.⁶ .............................................. A63F 9/22
[52] U.S. Cl. ............................ 273/439; 273/138 A; 379/95
[58] Field of Search ............... 273/439, 138 R, 138 A, 273/269, 237, 85 G; 379/90, 91, 93, 95

[56] References Cited

U.S. PATENT DOCUMENTS

| | | | |
|---|---|---|---|
| 4,669,730 | 6/1987 | Small | 273/138 A |
| 4,713,837 | 12/1987 | Gordon | 379/93 |
| 4,792,968 | 12/1988 | Katz | 379/92 |
| 4,815,741 | 3/1989 | Small | 273/138 A |
| 4,842,278 | 6/1989 | Markowicz | 273/138 A |
| 4,845,739 | 7/1989 | Katz | 379/92 |
| 4,922,522 | 5/1990 | Scanlon | 273/138 A |
| 4,969,183 | 11/1990 | Reese | 273/138 A |

FOREIGN PATENT DOCUMENTS

| | | | |
|---|---|---|---|
| 1162336 | 2/1984 | Canada | 379/93 |

*Primary Examiner*—Jessica J. Harrison
*Attorney, Agent, or Firm*—Weingram & Zall

[57] ABSTRACT

A wagering system for accepting wagers over the telephone comprising: (a) automatic call director means (ACD) for receiving incoming calls from subscribers who wish to wager on the system; b) voice responsive means (wagering VRU) connected thereto for receiving the incoming calls routed from the ACD, and for playing a series of recorded audio messages requesting subscriber wager information to be input via telecommunication means; and (c) host processor means having storage means and being connected to the wagering VRU for receiving the subscriber wager information, storing it in a master subscriber wager file in the storage means, and assigning an associated ticket number to the wager.

34 Claims, 18 Drawing Sheets

FIG. 2A

SUBSCRIBER ENROLLMENT
SCRIPT 1

VRU: WELCOME TO THE AUTOMATED SUBSCRIBER ENROLLMENT PROCESS. YOU WILL BE ASKED A SERIES OF QUESTIONS TO WHICH YOU WILL RESPOND BY PRESSING THE APPROPRIATE NUMBERS ON YOUR TOUCH TONE TELEPHONE. WHEN YOU HAVE ANSWERED ALL QUESTIONS YOU WILL BE TRANSFERRED TO A CUSTOMER SERVICE AGENT WHO WILL PROVIDE YOU WITH MORE INFORMATION ABOUT THE TELEWAGERING PROCESS. IN ADDITION THE AGENT WILL CONFIRM ALL THE INFORMATION WHICH YOU HAVE PROVIDED.

PLEASE SELECT THE CREDIT CARD YOU WISH TO USE. WE WILL ALSO OBTAIN CREDIT INFORMATION FROM YOUR CREDIT CARD COMPANY AT THIS TIME.

PRESS 1 FOR VISA
      2 FOR MASTER CARD
      3 FOR DISCOVER
      4 FOR AMERICAN EXPRESS
      5 FOR DINERS CLUB

RESPONSE: 1

VRU: YOU HAVE SELECTED VISA
ENTER YOUR CARD NUMBER

RESPONSE: 1234567890123456

VRU: YOU ENTERED 123 456 789 012 345 6
PRESS 1 TO CONFIRM
      2 TO RE-ENTER

FIG. 2B

SUBSCRIBER ENROLLMENT
SCRIPT 2

VRU: ENTER YOUR FOUR DIGIT EXPIRATION MONTH AND YEAR

RESPONSE: 1189

VRU: YOU ENTERED 11 89
PRESS 1 TO CONFIRM
     2 TO RE-ENTER

RESPONSE: 1

VRU: ENTER YOUR 2 DIGIT WEEKLY WAGER AMOUNT

RESPONSE: 10

VRU: YOU ENTERED 10 DOLLARS
PRESS 1 TO CONFIRM
     2 TO RE-ENTER

RESPONSE: 1

VRU: THE SYSTEM WILL NOW CHARGE YOUR CREDIT CARD WITH $50 PROVIDING YOU WITH AN OPEN BALANCE TO WAGER. WE WILL ALSO OBTAIN YOUR CREDIT INFORMATION FROM THE CREDIT CARD COMPANY YOU'VE SELECTED. PRESS 1 TO AUTHORIZE THE WITHDRAWAL AND OBTAINING OF CREDIT INFORMATION.

RESPONSE: 1

VRU: YOU WILL NOW BE TRANSFERRED TO A CUSTOMER SERVICE AGENT.

SUBSCRIBER IDENTIFICATION & GAME SELECTION

FIG. 3A

LOTTERY TELEWAGERING

SCRIPT 1 - SUSCRIBER IDENTIFICATION

| | |
|---|---|
| VRU: | WELCOME TO LOTTERY TELEWAGERING<br>ENTER YOUR ACCOUNT NUMBER |
| RESPONSE: | 123456789098 |
| VRU: | YOU ENTERED 123 456 789 098<br>PRESS 1 TO CONFIRM<br>      2 TO RE-ENTER |
| RESPONSE: | 1 |
| VRU: | ENTER YOUR PERSONAL I.D. |
| RESPONSE: | 12345 |
| VRU: | YOU ENTERED 123 45<br>PRESS 1 TO CONFIRM<br>      2 TO RE-ENTER |
| RESPONSE: | 1 |
| VRU: | ENTER YOUR 2 DIGIT WAGER AMOUNT |
| RESPONSE: | 10 |
| VRU: | YOU ENTERED 10 DOLLARS<br>PRESS 1 TO CONFIRM<br>      2 TO RE-ENTER |
| RESPONSE: | 1 |

FIG. 3B

LOTTERY TELEWAGERING

SCRIPT 2 - LOTTERY SELECTION

VRU: YOU WILL NOW BE ASKED TO SELECT THE LOTTERY IN WHICH YOU WISH TO WAGER.

TO WAGER PRESS

1 FOR CONNECTICUT

2 FOR NEW JERSEY

3 FOR NEW YORK

4 FOR PENNSYLVANIA

5 FOR OTHER STATES

RESPONSE: 2

FIG. 3C

LOTTERY TELEWAGERING

SCRIPT 2 - LOTTERY SELECTION

VRU: WELCOME TO NEW JERSEY LOTTERY

PRESS 3 FOR PICK 3
4 FOR PICK 4
6 FOR PICK 6
7 FOR LUCKY 7

RESPONSE: 6

HOST VALIDATE SUBSCRIBER PROCESS

6-DIGIT LOTTO PROCESS

FIG. 5A

LOTTERY TELEWAGERING

SCRIPT 4 - QUICK PICK WAGER

VRU: YOU HAVE CHOSEN PICK 6 LOTTO
PRESS 1 FOR QUICK PICK
2 TO ENTER YOUR NUMBERS

RESPONSE: 1

VRU: ENTER YOUR SIX TWO DIGIT
PRESS 2 DIGIT DOLLAR AMOUNT

RESPONSE: 10

VRU: YOU HAVE ENTERED 10 DOLLARS
PRESS 1 TO CONFIRM
2 TO RE-ENTER

RESPONSE: 1

VRU: PLEASE HOLD FOR CONFIRMATION
PLAY 1    1 12 19 34 39 46
PLAY 2   13 22 28 35 39 49
PLAY 3    5  9 14 27 29 32
PLAY 4   13 19 20 28 41 48
PLAY 5    3 12 18 31 39 43
TICKET NUMBER IS 122 387 913 027
PLAY 6    8 10 21 28 36 42
PLAY 7    6 13 25 29 32 44
PLAY 8   21 29 32 38 40 47
PLAY 9   19 23 28 32 40 43
PLAY 10  2  9 14 20 31 38
TICKET NUMBER IS 122 387 918 017
PRESS 1 TO PLACE ANOTHER BET
3 TO STOP WAGERING

RESPONSE: 3

VRU: THANK YOU FOR PLAYING

FIG. 5B

LOTTERY TELEWAGERING

SCRIPT 4A – PERSONAL NUMBERS

VRU: YOU HAVE CHOSEN PICK 6 LOTTO
PRESS 1 FOR QUICK PICK
    2 TO ENTER YOUR OWN NUMBERS

RESPONSE: 2

VRU: ENTER YOUR SIX TWO DIGIT
NUMBERS FROM 01 – 54

RESPONSE: 051016182937

VRU: YOU ENTERED 5 10 16 18 29 37
PRESS 1 TO CONFIRM
    2 TO RE-ENTER

RESPONSE: 1

VRU: PRESS 1 TO PLACE ANOTHER BET
    2 TO SELECT ANOTHER GAME
    3 TO STOP WAGERING

RESPONSE: 3

VRU: PLEASE HOLD FOR CONFIRMATION
YOUR TICKET NUMBER IS 209 532 901 302

THANK YOU FOR PLAYING

3-DIGIT GAME PROCESS

4-DIGIT NUMBER GAME PROCESS

KENO GAME PROCESS

HOST WAGER PROCESS

HOST CREDIT CARD AUTHORIZATION PROCESS

HOST ADDITIONAL FUNDS PROCESS

COMPUTERIZED LOTTERY WAGERING SYSTEM

This is a continuation of U.S. Ser. No. 08/004,633, filed on Jan. 12, 1993, abandoned, which was a continuation of U.S. Ser. No. 07/489,814, filed on Mar. 6, 1990, now abandoned.

This invention relates to an automated telecommunication system for processing lottery wagers received over the telephone.

BACKGROUND OF THE INVENTION

Typically, in the United States in order to play a state lottery either one physically goes to a designated state lottery agent to place a wager, or subscribes to a lottery service that plays daily or weekly their same lottery numbers for a fee.

Other known lottery systems for placing a lottery wager include the following. In the U.S. Pat. No. 4,842,278, Markowitz describes a lottery network system having individual lotteries interfaced together through to a network which processes player entries for plays in both the individual local lottery or the national lotteries. The player places bets on a lottery terminal by pressing various keys on its keyboard in response to a menu-driven screen display. In Canadian Patent No. 1,162,336, De Bruyn describes a telecommunication system adapted for processing gambling stakes for the Canadian national lottery for both French and Dutch speaking subscribers. The system is connected to a telephone exchange which answers a subscriber's call and requests lottery numbers and a wager, which the subscriber inputs by means of a selector device on the telephone. A memory device records the subscriber's telephone number, lottery numbers and the wager. A converter device then converts these numbers as stored in the memory and transmits a confirmation message in either the Dutch or French language, depending upon the telephone number, and repeats either the chosen lottery numbers and wager, or a rejection message because of a processing error.

There are other known telecommunications systems known for processing information via the telephone. U.S. Pat. Nos. 4,669,730 and 4,815,741, issued to Small, teach an automatic sweepstakes game for use on automatic teller machines and point of sales terminals. U.S. Pat. No. 4,713,837, issued to Gordon, teaches a system for remote reading of utility meters to effect electronic billing. U.S. Pat. Nos. 4,792,968 and 4,845,739, issued to Katz, teach a telecommunications system to elicit and process information from a subscriber, which inputs information by pressing keys on a terminal in response to a voice generator. In the Katz systems, this data is processed for statistical analysis for correlating the data inputs of various subscribers to find isolated subsets from that data.

None of the aforementioned systems allow a subscriber to call up on a touch-tone telephone, set up an account with a lottery system, place wagers in one or more lotteries available on the system, and charge the account for the wager.

SUMMARY OF THE INVENTION

Accordingly, the invention provides a lottery, wagering system comprising:

(a) automatic call director means (ACD) for receiving incoming enrollment calls from subscribers who wish to enroll with the system, and for receiving incoming wagering calls from subscribers who wish to wager with the system;

(b) first voice responsive means (enrollment VRU) connected thereto for receiving the enrollment calls routed from the ACD, for playing a series of recorded audio messages requesting subscriber enrollment information to be input via touch-tone telephone means, the subscriber enrollment information including a credit card selection corresponding to one of a plurality of credit card companies, and a credit card number associated with the credit card selection, and for playing an associated series of audio messages requesting confirmation of the subscriber enrollment information;

(c) second voice responsive means (wagering VRU) also connected thereto for receiving the wagering calls routed from the ACD, for playing a series of recorded audio messages requesting subscriber wager information to be input via the touch-tone telephone means, the subscriber wager information including an account number, a personal account number, a personal identification number, a particular lottery game format chosen from a plurality of lottery game formats available, lottery numbers and a wagering amount for the particular lottery game chosen, for playing an associated series of audio messages requesting confirmation of the subscriber wager information, then for playing an audio confirmation message with an associated lottery ticket number assigned to the lottery wager; and (d) host processor means having storage means and being connected to both the enrollment VRU and the wagering VRU, for receiving the subscriber enrollment information routed from the enrollment VRU and storing it in a master subscriber enrollment file in the storage means, and for receiving the subscriber wager information, comparing it to a master subscriber enrollment file to validate it, storing it in a master subscriber lottery wager file in the storage means, and assigning to it the associated lottery ticket number for the wager.

DESCRIPTION OF THE FIGURES IN THE DRAWING

The foregoing and other objects, features and advantages will be apparent from the following description of the preferred embodiment of the invention as illustrated in the accompanying figures of the drawing. There are shown in the figures of the drawings embodiments which are presently preferred. It should be understood that the invention is not limited to the precise arrangement and instrumentality shown in these figures wherein:

FIGS. 2a and 2b show the script for the messages played by the VRU back to the subscriber.

FIGS. 3a, 3b and 3c show the script for the messages played by the VRU back to the subscriber.

FIGS. 5a and 5b show the scripts for the messages played by the VRU back to the subscriber.

DESCRIPTION OF THE PREFERRED EMBODIMENTS

Figure 1:
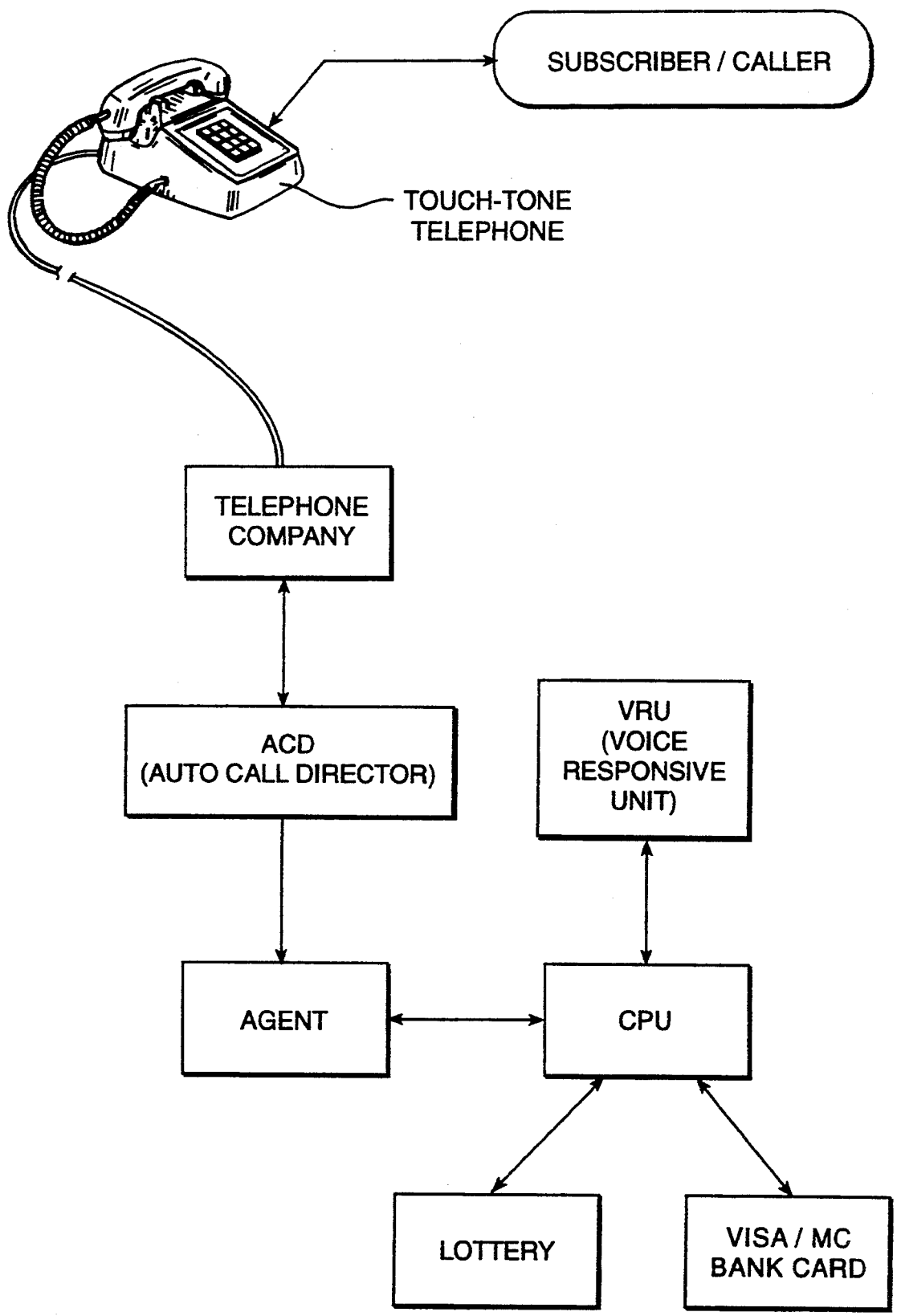
FIG. 1 is a schematic diagram of the lottery wagering system.

Generally, as shown in FIG. 1, the invention herein is a computerized telecommunications lottery wagering system. The system automatically handles telephone calls from subscribers with an automatic call director (ACD). A voice responsive unit (VRU) welcomes the subscriber to the lottery wagering system and places a wager for the subscriber based on information elicited from them over the telephone including and account number, personal ID number, the particular state lottery of interest, the particular lottery format of interest, such as 6-Digit lotto, "Keno", 3-Digit lotto, the type of wager, "Quick-Pick" or "personal Numbers", and a betting amount. The host computer (hereinafter "host") stores the information in a mainframe computer and confirms the wager back to the subscriber via the VRU.

The host is more completely described in an IBM brochure entitled, IBM System/88 Digest, First Edition(December 1988), Publication no. G520 6518-00, which is hereby incorporated by reference. The ACD is more fully described in an AT&T brochure entitled, An Introduction to Definity 75/85 Communications System, Generic 2, which is hereby incorporated by reference. The VRU is more fully described in a Perception Technology brochure entitled, BT-111 The Perception Advantage, which is hereby incorporated by reference.

In one embodiment, the system provides subscribers with two 800 numbers, one for the purpose of enrolling as a subscriber and the other for the purpose of placing wagers. When the subscriber dials either of the 800 numbers they will be connected to their local telephone company, and then ultimately into the network of the WATTS carrier that are selected to provide the service. All calls are connected to the ACD from the WATTS network and routed to the appropriate VRU. The ACD routes Enrollment calls to enrollment VRUs and wagering calls to wagering VRUs. To determine the subscriber's originating location the system utilizes a feature of the network called Automatic Number Identification (ANI). The ANI feature allows the system to determine, at a minimum, the area code and 3-digit exchange of the caller and in many instances the entire 10-digit telephone number. In one embodiment, the system uses the area code to limit the caller to placing wagers only with the state lottery within the state from which they are calling. In another embodiment the system allows the subscriber to place lottery wagers on an interstate or interstate basis, so that a lottery wager can be placed from anywhere to any state, or even international, lottery through the use of a touch-tone telephone. Both the intrastate and interstate wagering are discussed in more detail below.

SUBSCRIBER ENROLLMENT PROCESS

Figure 2:
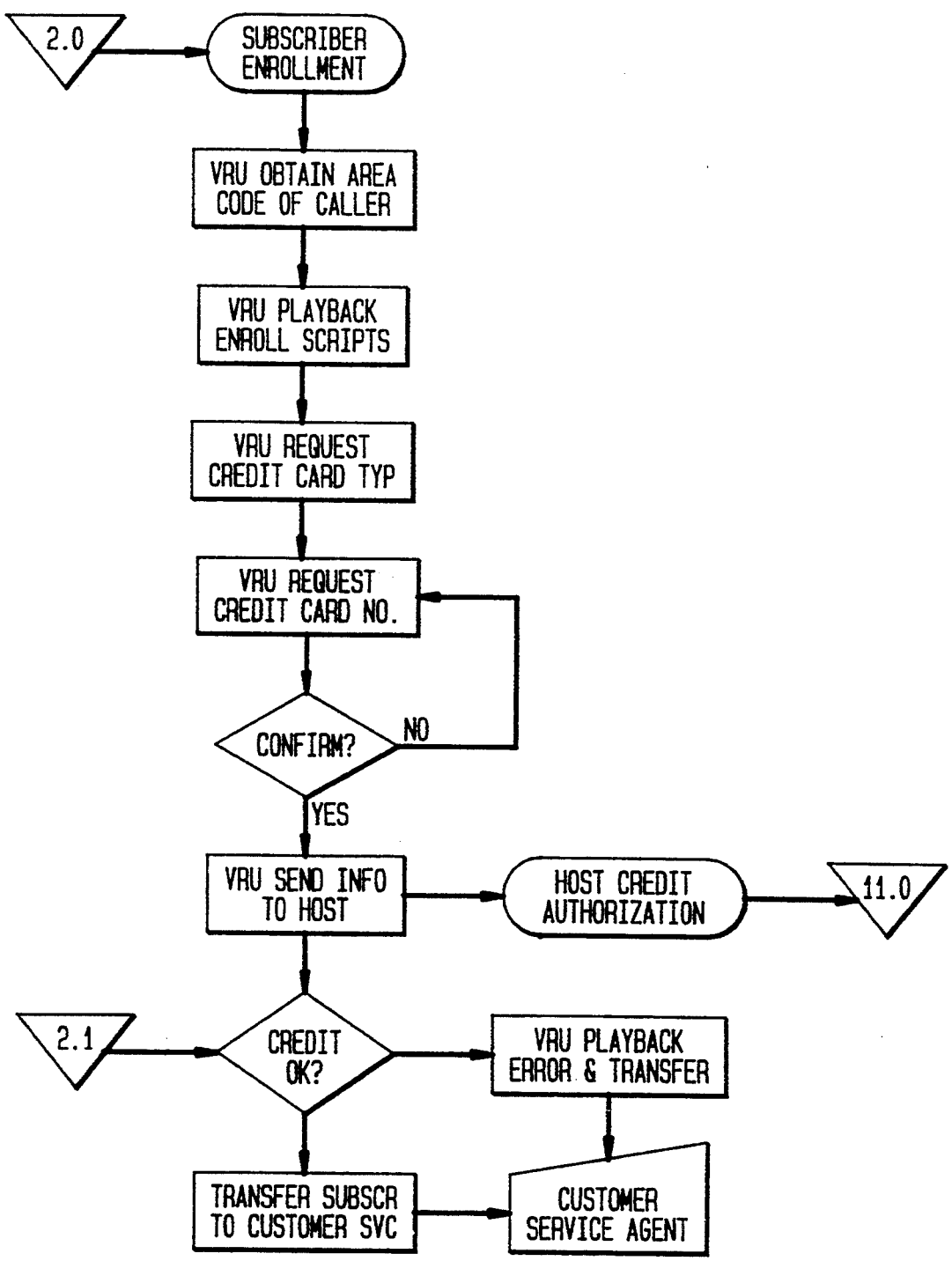
FIGS. 2 shows a flow chart of a subscriber enrollment process.

FIG. 2 shows a flow chart of the Subscriber Enrollment process of the VRU, and FIG. 2a and 2b respectively show the associated Subscriber Enrollment VRU scripts. In this case, for example, the subscriber would have dialed 1-800-ENROLL and been connected to an enrollment VRU by the ACD. The system is adaptable to any actual enrollment/customer service 800 number assigned by the telephone company.

Utilizing the ANI feature, the VRU will store the telephone number of the subscriber and play the subscriber enrollment script as depicted in FIG. 2a. First the VRU plays a welcome message to the subscriber, welcoming them to the automated Subscriber Enrollment Process, and then asks them to respond to a number of questions by pressing the appropriate number on their touch tone telephone.

As shown in FIG. 2a, the first question to be asked is "Please select the credit card you wish to use". For example, in the process of selecting the caller will be asked to press "1 for VISA", "2 for Mastercard", "3 for Discover", "4 for American Express", and "5 for Diners Card". In the example, the caller responded with a '1' and the VRU played back a message, "You have selected VISA, enter your card number". After the subscriber enters their card number, the VRU plays back the numbers entered and requests confirmation of the account number or re-entry. For example, the VRU plays back, "You have entered 123, 456, 789, 012, 345, 6, press 1 to confirm, 2 to re-enter". If the number played back is incorrect the caller would press 2 and re-enter their account number. If the number was correct the caller would press 1 and the VRU would store the number and immediately send a transaction to the host to initiate the Host Credit Card Authorization process as indicated by the off page connector 11.0 (shown as an inverted pyramid), see FIG. 11 described herein. The VRU sends a transaction code, credit card type code, and credit card account number to the host. This authorization process is described later in this document.

Concurrently with that authorization by the host, the VRU continues the automated enrollment process by playing Subscriber Enrollment Script 2 (FIG. 2b). The VRU plays a message requesting the subscriber to enter the four-digit expiration month and year of their credit card. In our example, the caller entered "11 89", and the VRU responded with the message "You have entered 11 89, press 1 to confirm, 2 to re-enter". If the caller confirms the date by pressing 1 then the VRU will respond with the message "Enter your two-digit weekly wager amount", else the VRU will again request the expiration month and year. When the caller then enters "10" signifying that on a weekly basis they wager ten dollars ($10.00) on lottery games, the VRU confirms the weekly wager amount by responding with a message "You have entered 10 dollars, press 1 to confirm, 2 to re-enter". In our example, since the caller pressed '1' to confirm, the VRU then plays the message, "The system will now charge your credit card with 50 dollars, providing you with an open balance to wager. We will also obtain your credit information from the credit card company you have selected. Press 1 to authorize the withdrawal and obtaining of credit information". To minimize the number of credit card transactions, in a preferred embodiment, the system software multiplies the wager amount entered by five and rounds upwards to the nearest ten dollars. If the subscriber entered five dollars, the system would multiply five by five giving twenty-five and round upwards to thirty dollars. This amount is withdrawn from the credit card creating an open balance to wager in the subscribers account. The caller confirms the withdrawal amount by pressing '1' and the VRU responds with a message, "YOU will now be transferred to a customer service agent."

Figure 11:
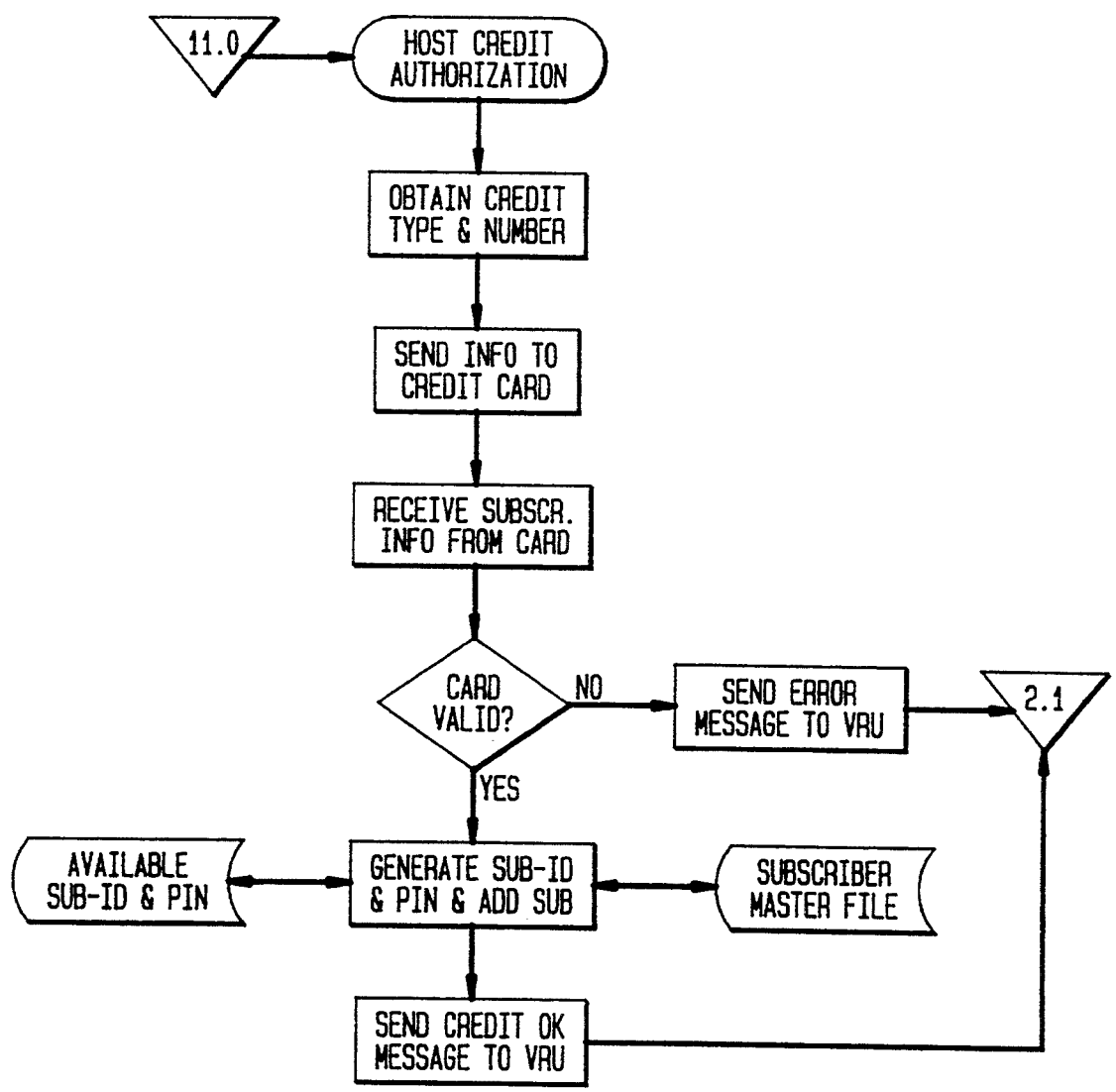
FIG. 11 shows a flow chart of the host credit card authorization process.

As indicated earlier, the VRU can send a transaction to the host which initiated the Host Credit Card Authorization process (FIG. 11). The host may for instance, be linked on-line to the credit card company's database to validate the subscriber's credit card number. In addition, the system obtains the caller's name, address, city, state, zip code, home and business telephone numbers, and their social security number. The host then stores the subscriber's credit card information in the subscriber master file, which is made available to the customer service agent when the caller is transferred to complete the enrollment. Subsequently, the customer service agent repeats all information entered by the subscriber and obtained from the credit card company. Once the caller verbally confirms all the information they will be provided with a subscriber ID, a personal ID number (PIN), and the 800 number to be used for wagering. The system will also request the preparation of an information packet which will be mailed to the subscriber. The entire conversation is recorded via a tape recorder that is connected to the ACD customer service agent's extension. The system will record all conversations using this equipment and since the system also records the date and time of each call, the recorded information is readily available.

This concludes the Automated Subscriber Enrollment Process. The subscriber is now able to place lottery wagers utilizing the system. The customer service agent can transfer the subscriber to a wagering VRU and the subscriber can start placing Wagers.

WAGERING AND GAME SELECTION PROCESS

Figure 3:
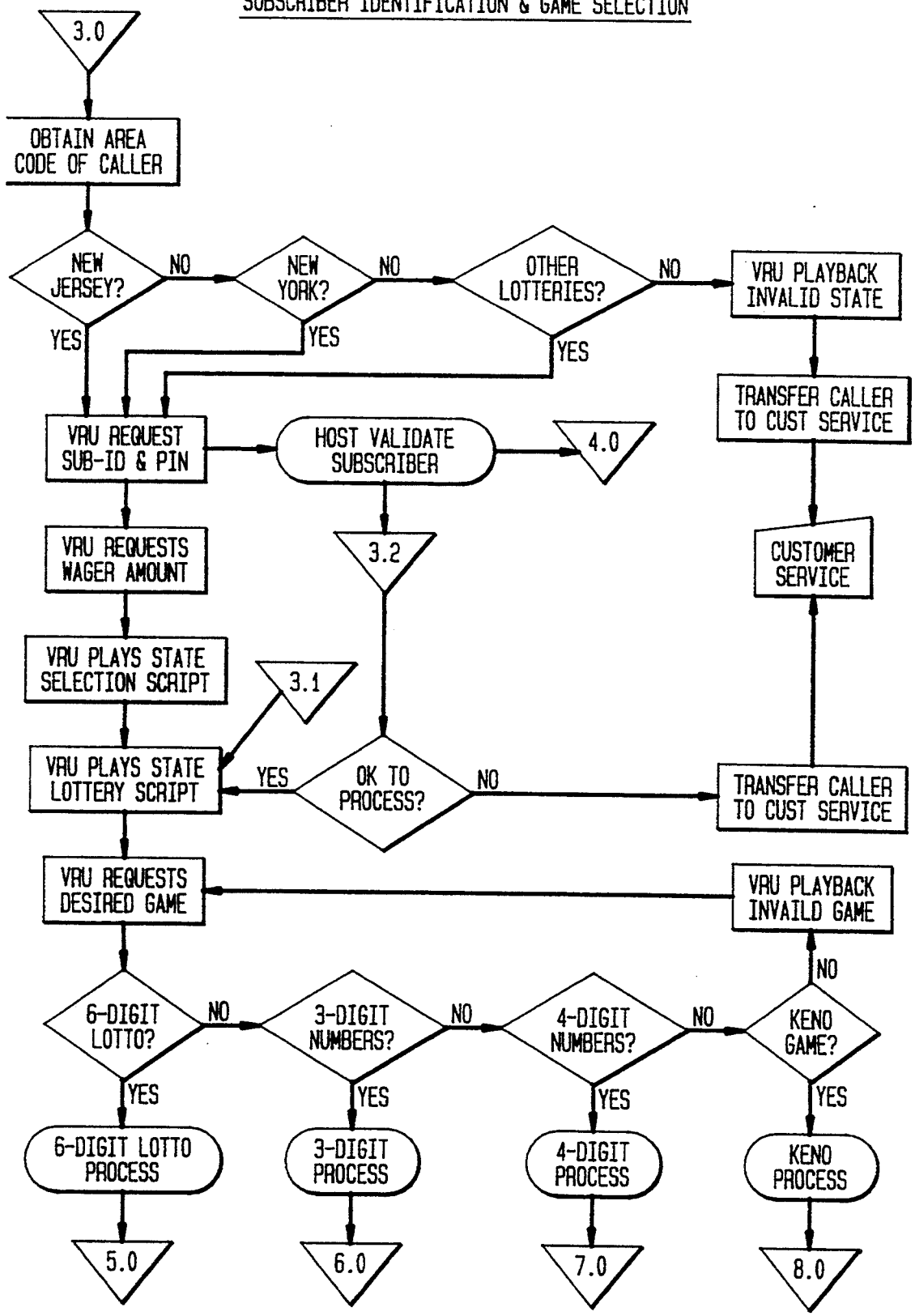
FIG. 3 shows a flow chart of the subscriber identification and game selection process.

FIG. 3 shows a flow chart of the Subscriber Identification and Game Selection process of the VRU, and FIGS. 3a, 3b, and 3c respectively show the associated wagering VRU scripts played to the subscriber. In one embodiment, for example, the subscriber would dial 1-800-WAGER to be connected to a wagering VRU by the ACD. The system is adaptable to any number assigned by the telephone company.

Utilizing the ANI feature, the wagering VRU will store the telephone number of the caller and play the subscriber identification script as depicted in FIG. 3a. Note that in the description of this embodiment the interstate wagering feature of the system is highlighted, but where appropriate, the differences related to intrastate wagering are mentioned. But generally, on an intrastate basis the subscriber would be blocked from wagering by the VRU if their call was not initiated from within a state that had a lottery. The subscriber would only be allowed to place wagers with that lottery.

As shown in FIG. 3 in the Subscriber Identification And Game Selection process, the VRU plays a welcome message to the subscriber and requests their account number as depicted in FIG. 3a. In our example, the subscriber entered '123456789098', and the VRU responded with, "You entered 123, 456, 789, 098, press 1 to confirm, 2 to re-enter". The subscriber responded with a 1 and the VRU then played the message, "Enter your personal ID". The subscriber entered '12345' and the VRU responded with "You entered 123, 45, press 1 to confirm, 2 to re-enter". The subscriber responded by pressing '1' to confirm that the number was correct. The VRU stores the subscriber ID and PIN and immediately sends a transaction to the host to validate the subscriber. The VRU sends a transaction code, subscriber ID, and PIN to the host which would immediately initiate the Host Validate Subscriber process, see FIG. 4 described herein.

The VRU then requests the entry of the amount to be wagered during this call. The host compares this amount to the subscriber's open balance to wager to insure that sufficient funds are available for wagering. The system only reduces the open balance to wager as wagers are placed and not by the entry of this wager amount. The VRU plays the message, "Enter 2-digit wager amount". In our example, the subscriber entered '10', and the VRU then responds with, "You entered 10 dollars, press 1 to confirm, 2 to re-enter". As shown the subscriber responded by pressing '1'.

In response to the subscriber input, the VRU plays either the script in FIGS. 3b or 3c. The determining factor is whether interstate wagering is allowed. For interstate wagering, the VRU plays the script in FIG. 3b, Lottery Selection, to the subscriber. This script gives the subscriber the option to select one of five options. The first four options will be the lotteries in close proximity to their state. The fifth option "Other States", will cause the VRU to play another script which will allow the subscriber to select from another group of lotteries. This will continue until the subscriber is given the option to select from any state with a lottery that utilizes the service. Once the subscriber makes their lottery selection the VRU plays the script in FIG. 3c, Game Selection.

In the Game Selection script shown FIG. 3c, the VRU presents the subscriber with the various lottery games available within the selected lottery. On an intrastate basis it presents the games available within the state from which the call initiated. For instance, the VRU plays a message and welcomes the subscriber to the lottery then plays a message, "Press 3 for 3-digit numbers, press 4 for 4-digit numbers, press 6 for Lotto, press 7 for Keno". In our example, the subscriber pressed '6' for Lotto. Now the subscriber can place a wager. They will now be transferred to the 6-digit Lotto process as described in FIGS. 5, 5a and 5b.

Figure 4:
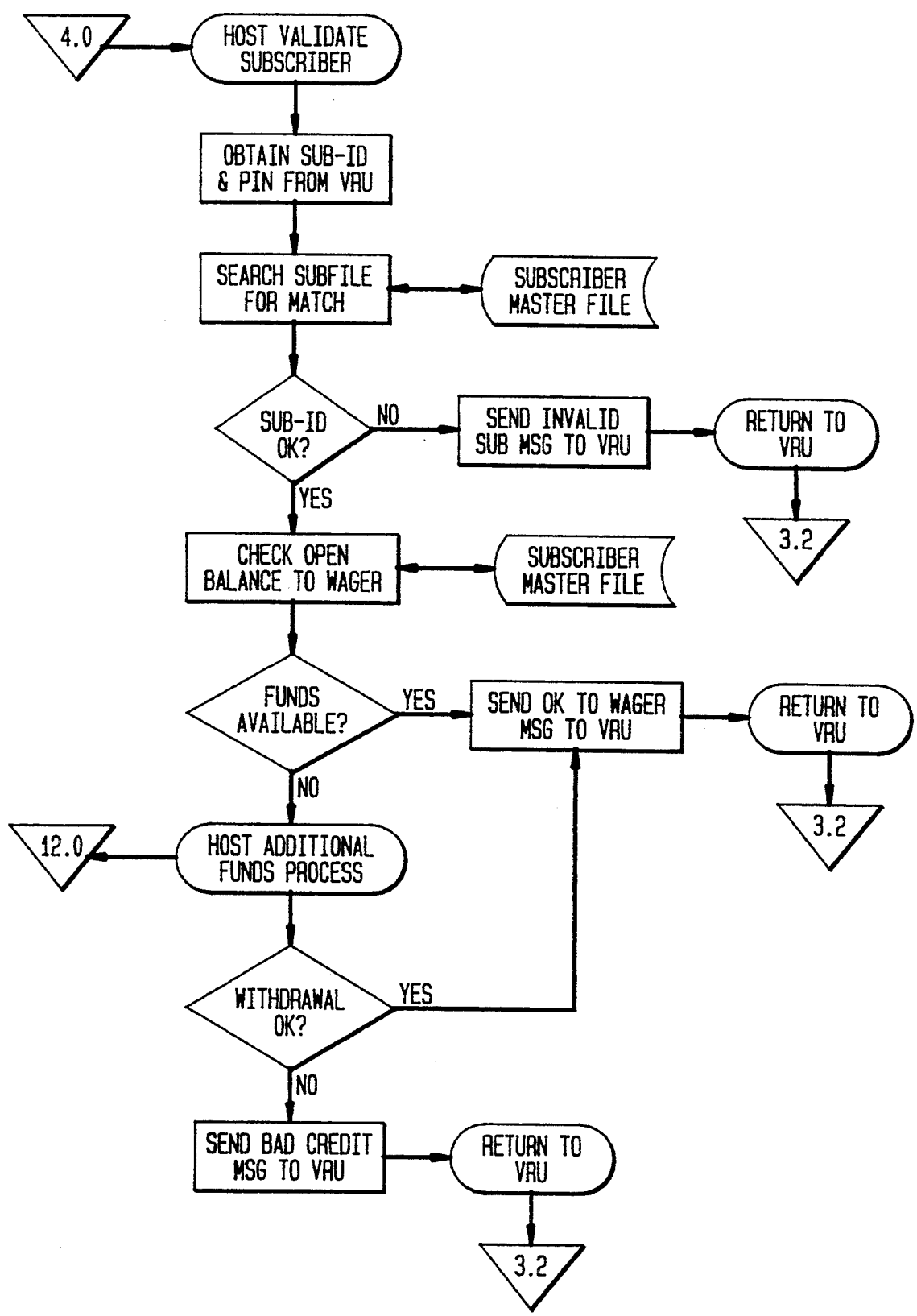
FIG. 4 shows a flow chart of the host validate subscriber process.

As described above, when the subscriber entered their ID and PIN, the VRU requested that the host validate the subscriber ID (see FIG. 4). At this point the host should have completed that process and has sent a signal to the VRU to allow the wager to proceed or to transfer the subscriber to customer service in the event of a problem. (The VRU also can be programmed to determine that a subscriber is having difficulty in using the system.) If the subscriber cannot place a wager for any reason at this point, the VRU will transfer the caller to a customer service agent for assistance in completing the wager. If the host Subscriber Validation process was successful, the host returns an appropriate message to the VRU allowing the wagering to proceed. This concludes the discussion of FIGS. 3, 3a, 3b, and 3c, known as Subscriber Identification and Game Selection process.

HOST VALIDATE SUBSCRIBER PROCESS

FIG. 4 shows a flow chart of the Host Validate Subscriber process, which validates the subscriber identification to the system and determines whether they have sufficient funds to place a wager. For instance, in response to voice commands from the VRU, the subscriber enters their subscriber ID and their PIN. The host receives this information from the VRU and calls the validation process which searches a subscriber master file for a match. If a match does not exist, then the host sends an invalid subscriber message signal to the VRU, which plays an invalid subscriber message back to the subscriber. If a match is found, then the host compares the subscriber's open balance to wager against the amount which they indicated they would be wagering. If there are sufficient funds, then the host sends a sufficient funds signal to the VRU and the subscriber would then be allowed to proceed. The system then returns to off page connector 3.2 (shown as an inverted pyramid and also known as an off page connector), see FIG. 3. In our example, since funds are available the host sends a message signal back to the VRU to proceed with the wager. If funds are not available, the host calls the Host Additional Funds process, indicated by the off page connector 12.0, see FIG. 12 described herein. In response to a withdrawal approval from the Host Additional Funds process, the host sends a sufficient funds signal to the VRU and the subscriber would then be allowed to proceed. In response to a withdrawal nonapproval, the host sends a bad card signal to the VRU which plays a bad card message back to the subscriber. The system then returns to off page connectors 3.2, see FIG. 3 described above.

SIX-DIGIT LOTTO PROCESS

Figure 5:
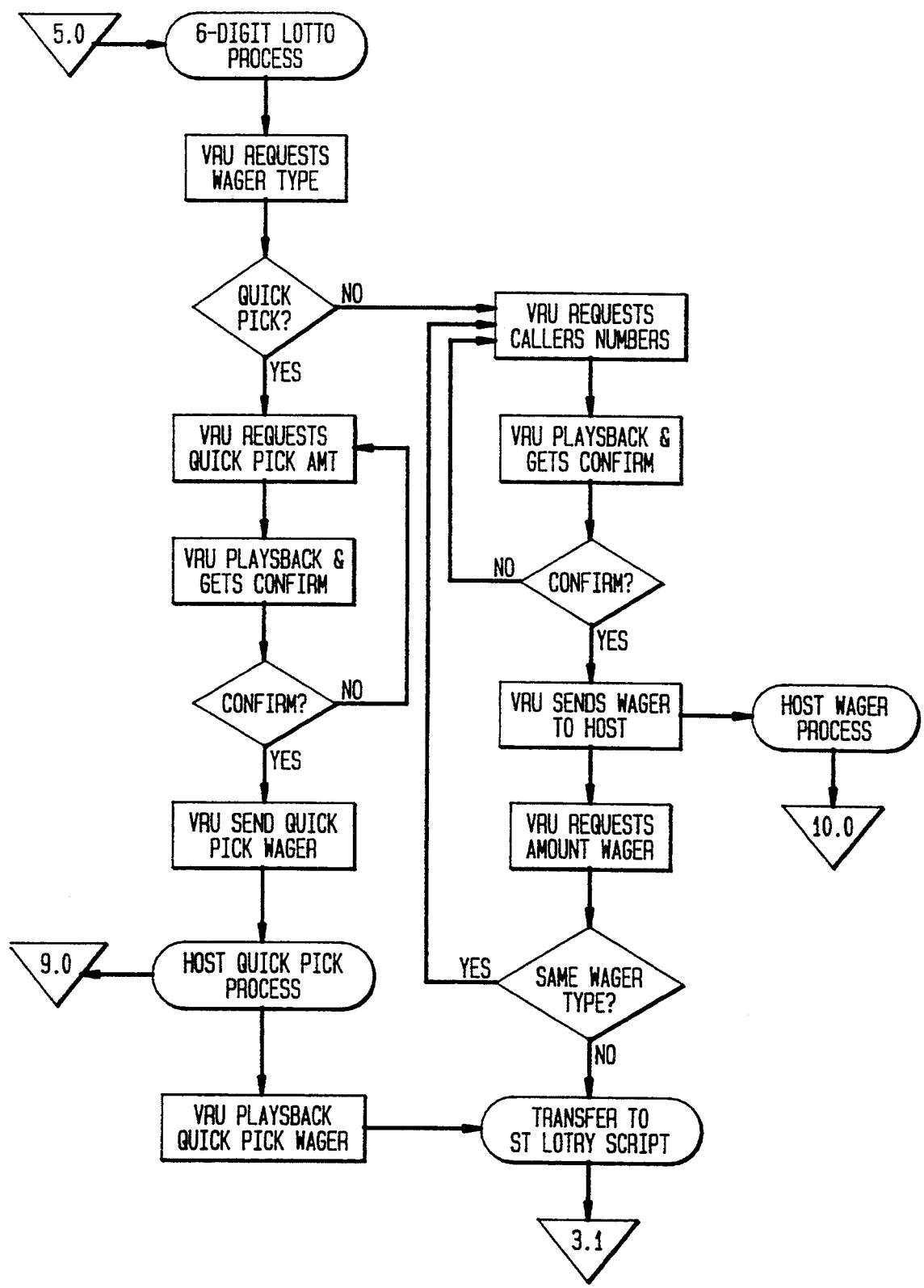
FIG. 5 shows a flow chart of the 6-digit Lotto process.

FIG. 5 shows a flow chart of the 6-digit Lotto process of the VRU, and FIGS. 5a and 5b show the scripts for the messages played by the VRU back to the subscriber. All of the game types described herein in FIGS. 5 to 8 from an overall systems perspective operate the same way. The essential difference between the games is the combination of numbers played, including both the amount and the range of numbers allowed. For example, 6-digit lotto, requires 6 two-digit numbers. Different state lotteries have variations on the range of number which can be selected. For example, in New Jersey the lotto game range is presently from 1 to 48, and subscribers can select any 6 numbers that are not repeated within that range. In New York's lotto game the range is presently from 1 to 54.

In the flow chart shown in FIG. 5, after the subscriber picks 6-digit lotto (see FIG. 3), the VRU requests a wagering type from the subscriber. In the script shown in FIG. 5a, the VRU plays a message "You have chosen pick 6 lotto" to inform the subscriber of their choice, and also requests in the message that they either "press 1 for Quick Pick" or "2 to enter your numbers". If the subscriber chooses Quick Pick by responding with a "1", then the VRU plays a message "You have selected Quick Pick press 2 digit dollar amount" (again see FIG. 5a). In the case of a Quick Pick wager, the VRU requests the entry of a Quickpick wager amount then confirms it. For example, if the subscriber responds with "10", then the VRU plays a message "You have entered 10 dollars, press '1' to confirm, press '2' to re-enter" to confirm or re-enter the subscriber's wagering amount. If the subscriber presses '2' to re-enter, the VRU again requests a Quick Pick amount. Presently, in the state of New Jersey a $10.00 wager results in 10 plays since every game cost $1.00, while in New York State the $10.00 results in 20 plays since every game costs 50 cents, although the minimum in New York is a $1.00 wager which gives the subscriber two games. After the subscriber confirms the $10.00 wager amount, the VRU sends to the host the subscriber id, the lotto selected, and 6-digit lotto wager for $10.00. The host then calls the Host Quick Pick process as indicated by off page connector 9.0, see FIG. 9 described herein.

In summary, in the Host Quick Pick process the host first determines the lottery's profile from a master state lottery file, and if the state lottery was in New Jersey, for example, where the range of numbers is from 1 to 48, then it would utilize a random number generating routine to generate 6 unique numbers between 1 and 48 for each game. Again for New Jersey, the Quick Pick process would generate 6 unique numbers for all 10 games. In comparison, if the call had been placed from New York, the host would have generated 20 games.

After the Host Quick Pick process returns with the Quick Pick numbers, the VRU plays a message "Please hold for confirmation" and plays each of the wagers generated back to the subscriber, see FIG. 5a. Note that the system only does so if the subscriber chooses to listen and record the numbers, if they hang up no message is played. The VRU also plays a confirmation or ticket number assigned by the host to that wager. As far as the overall system is concerned, once the subscriber confirms the wager amount, if the subscriber at that time choose to hang up the phone, it would still generate all of the wagers, place them in the lottery, and store all the wagers within for billing, inquiry and auditing purposes. On a monthly basis the system will produce a statement which will tell the subscriber every wager that was placed, every draw down that was made from their credit card, all service charges, an opening balance from the last statement, and a closing balance as a result of this statement. At this point the system returns to the state lottery script as indicated by the off page connector 3.1 and go to FIG. 3. Once again the system gives the subscriber the options: to place another wager, to select another game within this lottery, to select another lottery to place wagers, or finally to terminate the call.

In the alternative, the other option in the 6-digit lotto process was to allow the subscriber to enter their own numbers. If the subscriber chose to enter their own numbers by responding with '2' (i.e. no quick pick), the VRU plays the script in FIG. 5b. First, the VRU requests, based on the lottery profile, that the subscriber enters their 6 two-digit numbers within the range of 1 to 48 for N.J., or 1 to 54 for N.Y. The subscriber will utilize their touch tone phone to enter their 6 two-digit numbers. The VRU plays a message "enter your six two digit numbers from 1 to 54." In the example in FIG. 5b if the subscriber enters their numbers, then the VRU plays a message "you entered 5 10 16 18 29 37 press 1 to confirm or 2 to reenter". If the subscriber does not confirm then the VRU again requests the subscribers numbers. Else if the subscriber confirms then the VRU sends the wager to the host, which calls the Host Wager process, see off page connector 10.0 and go to FIG. 10 described herein. The VRU sends the subscriber's wager to the host to be processed, by passing to the host the subscriber ID, the lottery and game selected, the 6 two-digit numbers entered, and that the subscriber chose their own numbers. The VRU then requests the subscriber to enter another wager. At this point, if they choose to enter another series of numbers, they would be transferred back up to the point where the VRU requests the entry of their numbers, and they would stay in this loop until such time as they choose to do something else. Similar to that described above for the Quick pick option, at the conclusion of wagering or selecting their own numbers, the VRU will tell the subscriber to please hold on for confirmation, the host would have then come back to the VRU with a confirmation or ticket number which will be played back to the subscriber. The VRU, as in the Quick-Pick option, would now requests what they would like to do next, and based on the response, they will be transferred to the appropriate process or the call will be terminated. This concludes the discussion on the 6-digit lotto process.

THREE-DIGIT NUMBER PROCESS

Figure 6:
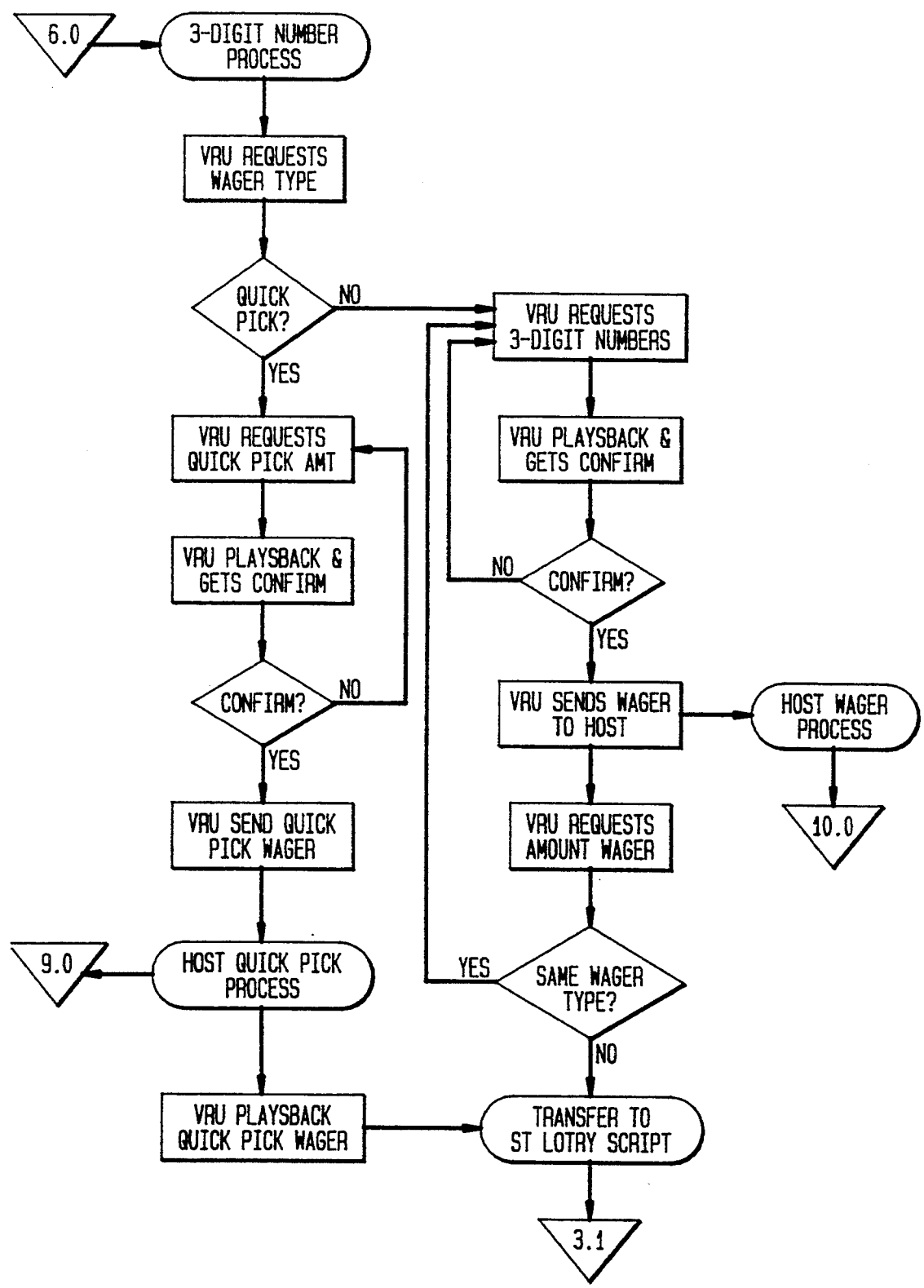
FIG. 6 shows a flow chart of the 3-Digit Number Game process.

FIG. 6 shows a flow chart of the 3-Digit Number Game process of the VRU. As earlier described, the processes are essentially the same except for the number of numbers being entered and the range. In the case of 3-digit numbers, the range of numbers allowed is from 1 to 999. Again, the subscriber has the Quickpick option and the option to enter their own numbers. As seen from the flow chart, the process works substantially the same way as the 6-digit lotto process described above.

FOUR-DIGIT NUMBER PROCESS

Figure 7:
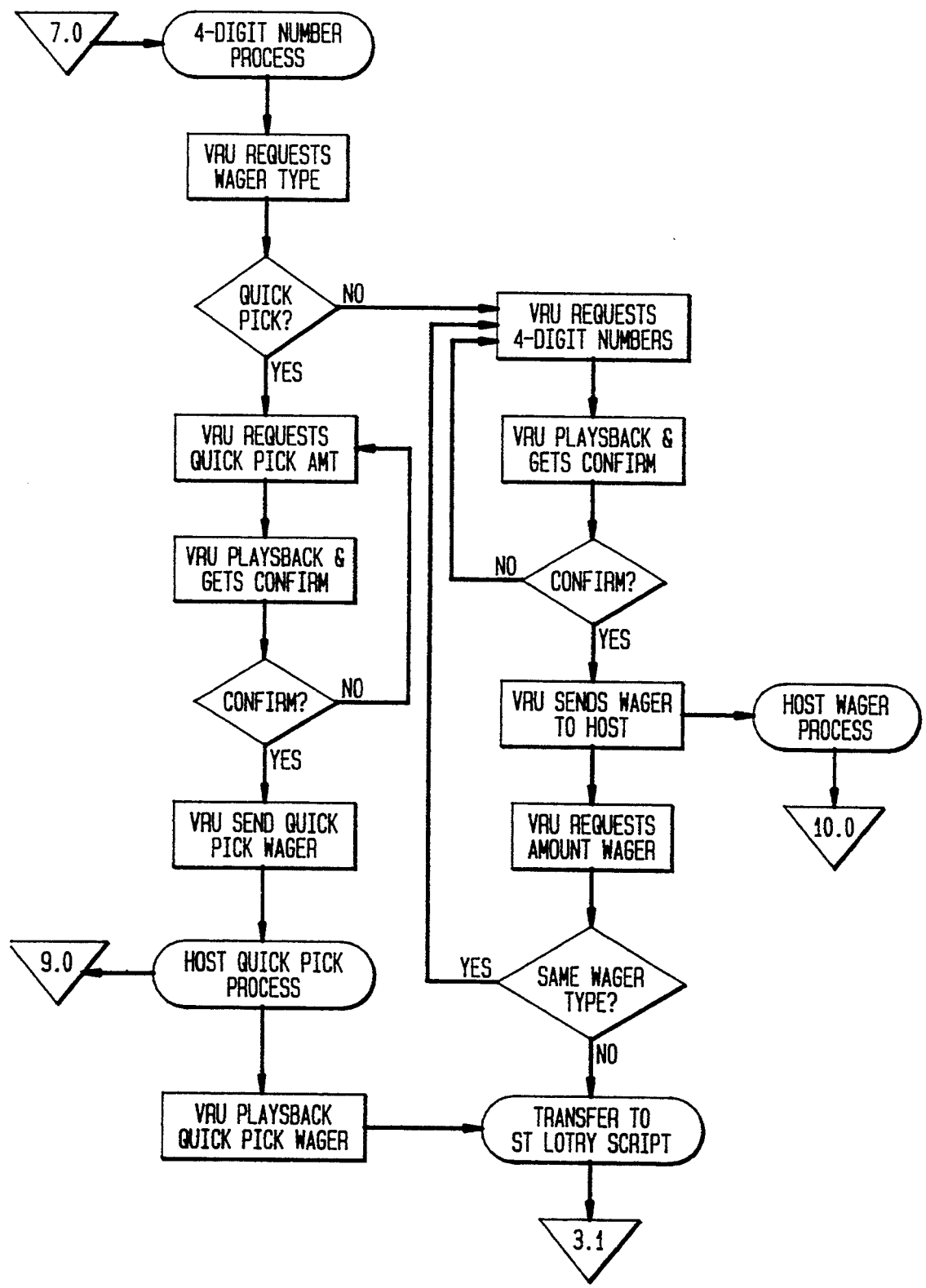
FIG. 7 shows a flow chart of the 4-Digit Number Game process.

FIG. 7 shows a flow chart of the Four-Digit Number process of the VRU. Again, this game is processed by the system essentially the same way as the 6-digit lotto option by choosing the Quickpick option or the entry of enter their own numbers. In contrast, the subscriber can select from a range from 1 to 9,999.

KENO PROCESS

Figure 8:
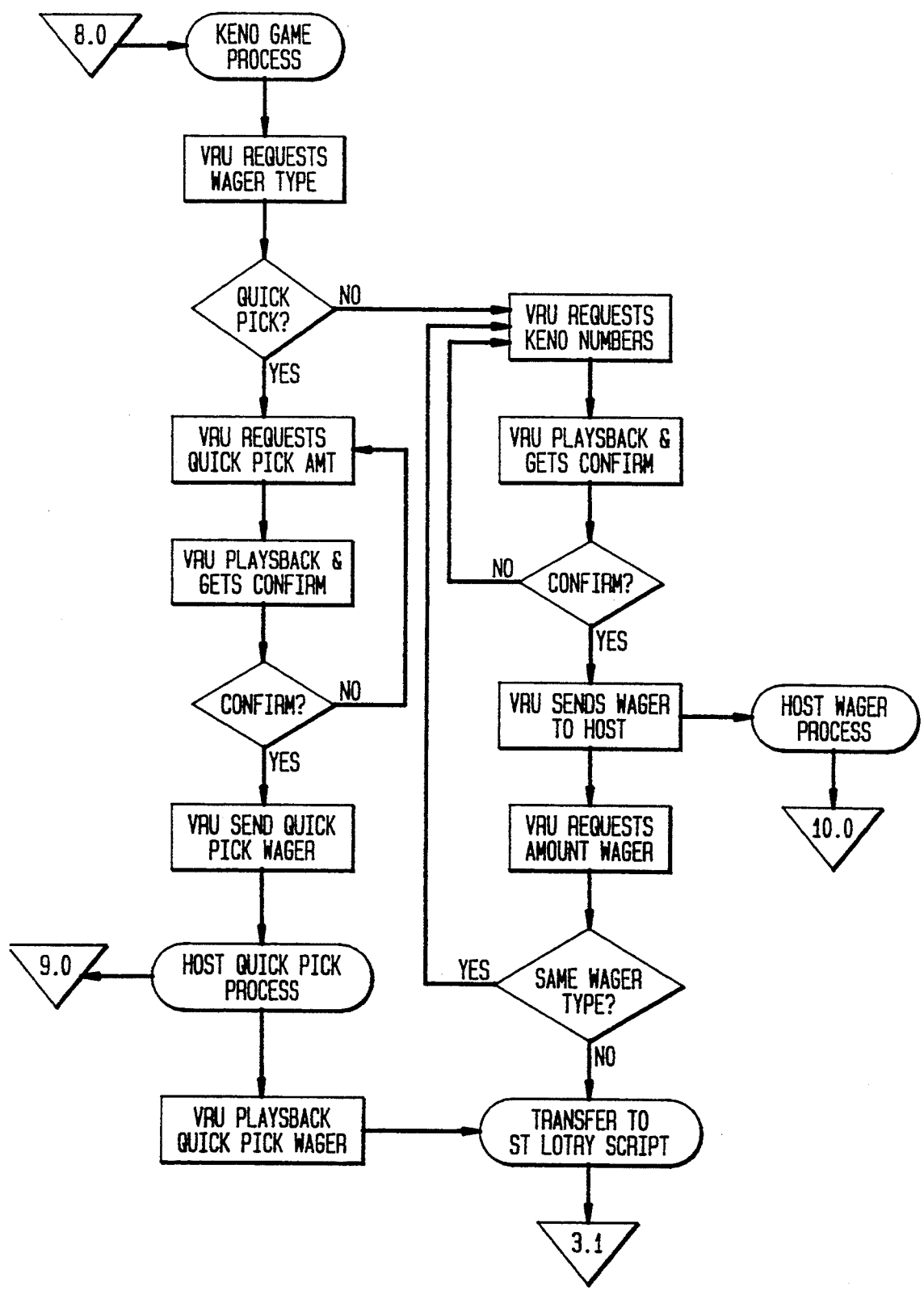
FIG. 8 shows a flow chart of the Keno process.

FIG. 8 shows a flow chart of the Keno process of the VRU. The Keno game typically works so that in order for the subscriber to win, they must choose 7 of the 11 numbers drawn by the lottery to win a prize, from a range of unique 2-digit numbers between 1 and 84. Lotteries describe this in many ways, talk about it and, in particular, in Pennsylvania, the Keno game is 7 out of 11 from 1–84. Once again, the subscriber can select a Quickpick or enter their own numbers. If they select a Quickpick, the randomizing routine would generate the numbers. If they choose to enter and confirm their own numbers, they will be asked to enter their 7 two-digit numbers. That concludes the Keno game process.

QUICK PICK PROCESS

Figure 9:
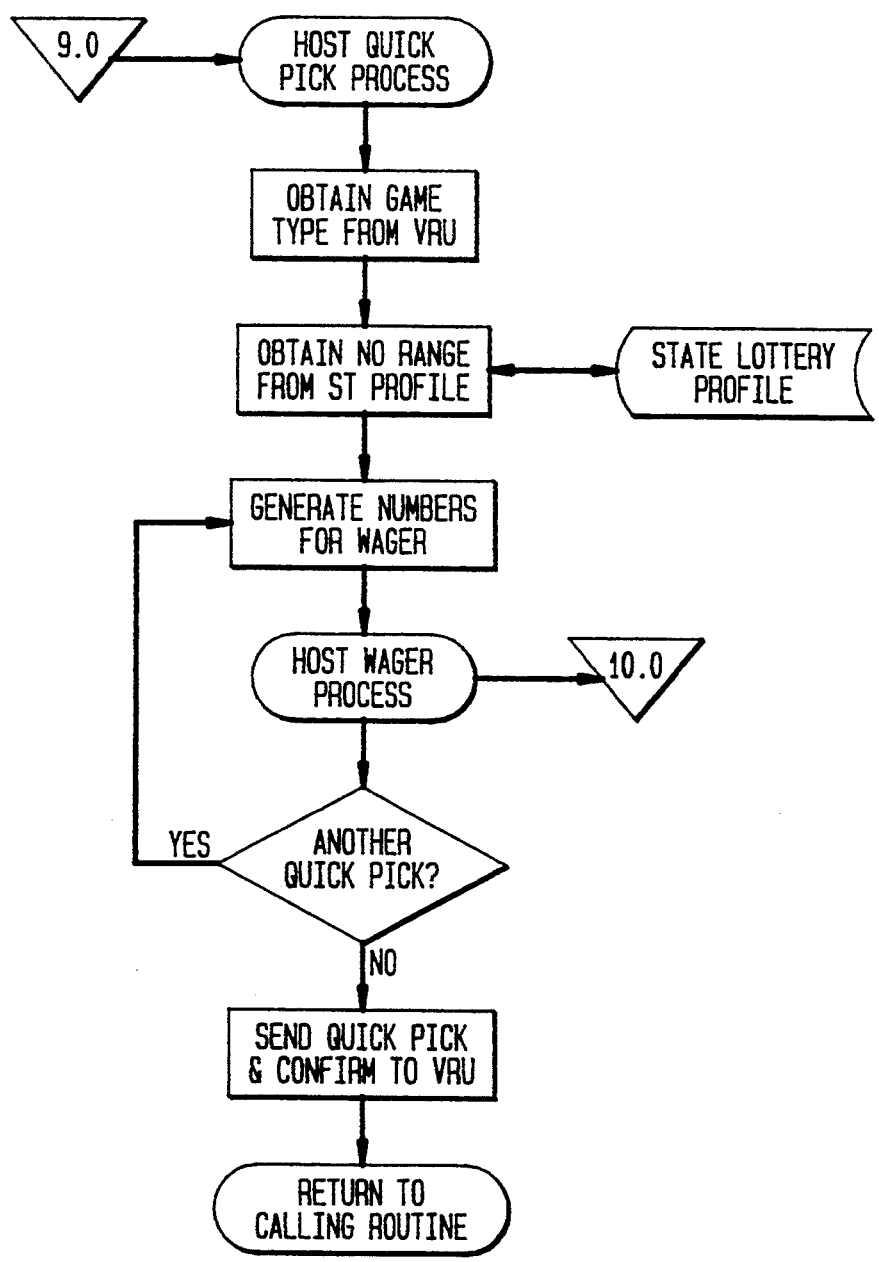
FIG. 9 show a flow chart of the host Quick Pick process.

FIG. 9 show a flow chart of the Quickpick process, called by the host whenever the subscriber chooses that option in any of the aforementioned games selected. In the Quickpick process, first the host obtains from the VRU the subscriber ID, the lottery, the game(such as lotto 3-digit, 4-digit, or Keno), a Quickpick option signal to indicate that the subscriber chose Quickpick, and the amount of the Quickpick option. In our example, we spoke about $10.00, which in N.J. means that 10 games or 10 wagers will be placed. After the host process receives this information, it examines the state lottery profile for the game in question to obtain the allowable number range, and passes that information on to the random number generator which would generate the appropriate numbers for the game. It will do this until the wager amount is exhausted. The host will send each wager back to the VRU. It will also call the host wager process to actually place the wagers with the state lottery and ultimately return to the VRU with the Quickpick selected. That concludes the Quickpick process.

HOST WAGER PROCESS

Figure 10:
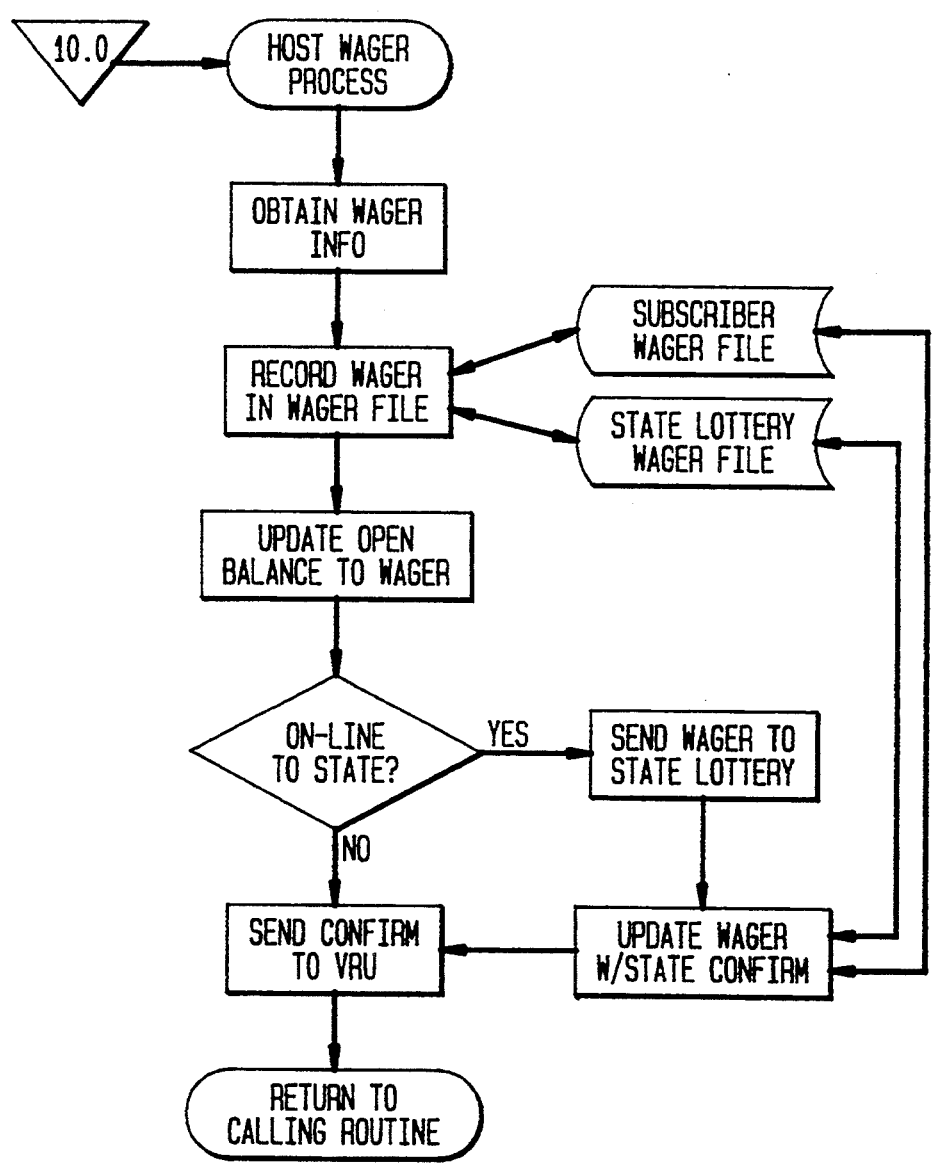
FIG. 10 shows a flow chart of the host wager process.

FIG. 10 shows a flow chart of the Host Wager process. The system calls this process from various points in the overall systems software. For instance, the system calls this process from the Quickpick process, or from the process when the subscriber chooses to enter their own numbers. In either case, the host wager process needs the information such as the subscriber ID, the lottery, the gamer the type of wager—be it Quickpick or individual personal numbers—and the actual numbers being entered. The numbers obviously vary depending on the game, but the process is the same regardless of the game. So this information is passed from the VRU. The wager will be recorded in the subscriber's wager file for the purpose of audit and monthly statements. It will also be recorded in the state lottery wager file so that both the system and the lottery can keep track of the wagers for that particular day that were placed with the lottery. For each wager the system updates the subscriber master file, specifically the open balance to wager field based on the amount of the wager. It reduces that amount by the size of the wager and the service charge. There are situations where the system may need to be connected directly to the lottery computer. The system sends the wager or wagers down to the lottery computer and receives back the ticket number or confirmation number. That ticket number or confirmation number will be utilized to update the subscriber wager file and at the same time will be utilized to update the lottery file. It is this same number which goes back to the VRU and played to the subscriber. Where the system is not connected to the lottery's computer, the ticket number or confirmation number will be a number which is generated by the system. All information will be transferred back to the routines which called the host wager process, be it the Quickpick process or be it the subscriber's entry of their own numbers for a particular game. That concludes the description on the host wager process (see FIG. 10).

HOST CREDIT CARD AUTHORIZATION PROCESS

FIG. 11 shows a flow chart of the Host Credit Card Authorization process. The VRU calls this process only during enrollment to elicit various information about the subscriber, specifically, name, address, city, state, zip, home phone, business phone, social security number, credit rating, etc. The aforementioned enrollment process, shown in FIG. 2, calls this host authorization process, the VRU provides it with the subscriber's credit card number and expiration date. The host, which is directly connected to the credit card company computer, from which the subscriber would have authorized the system to obtain the necessary information to complete their enrollment. The system will have access to the information and retrieve it back into the host computer. If there is no information to be obtained because the credit card number provided by the subscriber is invalid, an error message would go back to the VRU and the VRU would transfer the caller to the customer service agent. If the information we requested was retrievable, the host updates the subscriber master file with that information, looks at the available subscriber ID and PIN file for the next available subscriber numbers, and adds them to the master file. A message would go back to the VRU indicating that the credit card is valid, allowing the enrollment process to continue. The VRU then transfers the subscriber to a customer service agent for verbal verification of all information entered.

HOST ADDITIONAL FUNDS PROCESS

Figure 12:
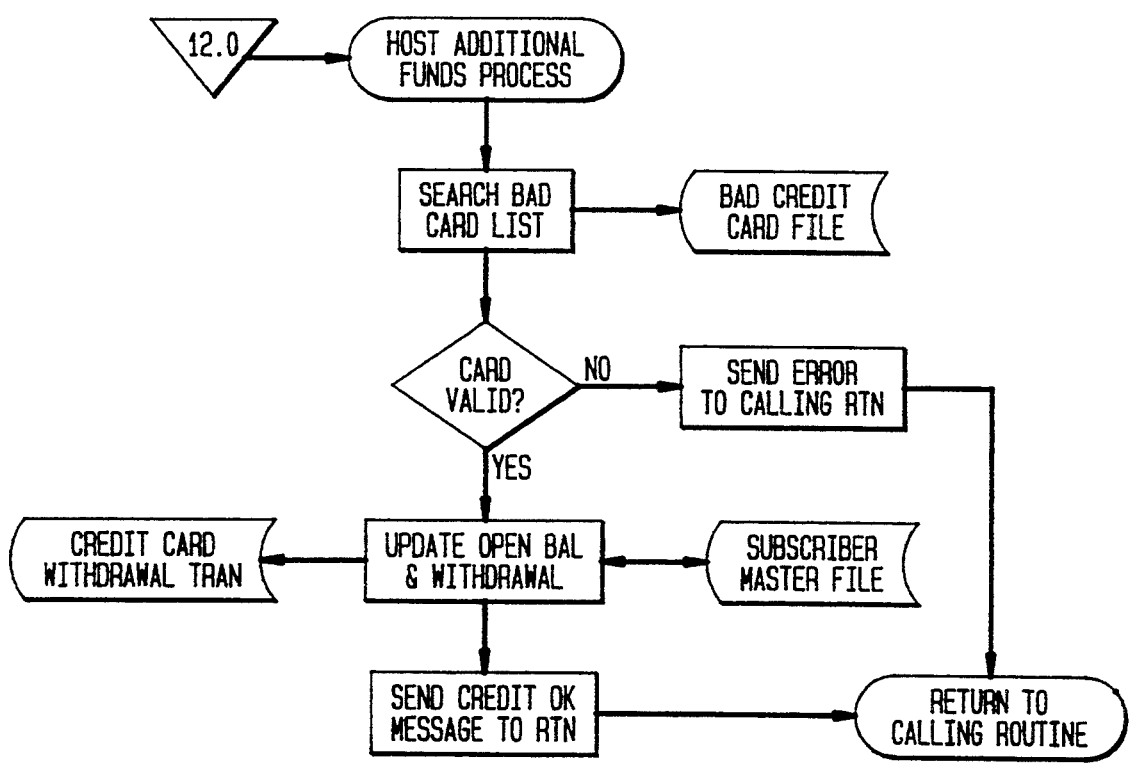
FIG. 12 shows a flow chart of the host additional funds process.

FIG. 12 shows a flow chart of the Host Additional Funds process. The host calls the process when additional drawdowns of funds from the credit card are needed for the subscriber. The host checks a bad credit card file, and if the subscriber's credit card number does not appear in that file, the credit card will allow a draw down" of funds up to the limit allowed without a direct communication for authorization.

The system has a database with a list of the latest bad cards provided by the credit card company, so the host compares the subscriber's credit card number to the bad credit card database to verify it. If the subscriber's card is not on the list, then the host can draw down funds to whatever limit is allowed by the credit card to the system. (For example, most credit card companies establish a limit of say $50.00 to a particular retails, as long as, the draw down is $50.00 or less, there is no need for direct communication with the credit card company to obtain authorization, and thereby the credit card company will pre-approve that limit without the direct communication.) The advantage to this approach is that the system minimizes the interaction with the credit card company because these transactions typically take 10 to 15 seconds to accomplish, perhaps even longer, thus avoiding lengthening the time of the call as there are costs that are associated with that. And assuming that the subscriber's card was not on the bad card list, the host can draw down the appropriate amount of funds and essentially return a signal to the VRU saying that funds are now available. In addition, a transaction is sent to that credit card company's daily charge file, transferred to the credit card company overnight, to assure that funds are received from the credit card company. If the subscriber's credit card is on the bad card list, the host sends a signal back to the VRU and the system returns to off-page connection 2.2 to indicate that a credit problem exists. The subscriber is then transferred to a customer service agent who knows that a credit problem exists, and would request a different credit card from the caller or would request some direction from the caller as to what we should do in order to allow them to wager. That concludes page 3, the validate process.

Some of the other features that the system is designed to accommodate include: 1) determine winning numbers in other states; 2) determine if a ticket which they hold, regardless of the lottery was a winner; 3) determine what wagers were made over a period of time; 4) place sports wagers; and 5) place horse racing wagers.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A wagering system for accepting wagers over the telephone comprising:

a) automatic call director means (ACD) for receiving incoming calls from subscribers who wish to wager on the system;

b) voice responsive means (wagering VRU) connected thereto for receiving the incoming calls routed from the ACD, and for playing a series of recorded audio messages requesting subscriber wager information to be input via telecommunication means; and c) host processor means having storage means and being connected to the wagering VRU for receiving the subscriber wager information, storing it in a master subscriber wager file in the storage means, and assigning an associated ticket number to the wager.

2. A wagering system as claimed in claim 1, wherein the wagering VRU plays an audio confirmation message with an associated ticket number assigned to the wager.

3. A wagering system as claimed in claim 1, wherein the wager VRU plays an associated series of audio messages requesting confirmation of the subscriber wager information.

4. A wagering system as claimed in claim 1, wherein the host validates the subscriber wagering information by comparing it to a master subscriber enrollment file.

5. A wagering system as claimed in claim 1, wherein the subscriber wager information includes a personal account number, a personal identification number, a particular wagering format chosen from a plurality of wagering formats available, at least one wager and a wagering amount corresponding to the particular wagering format chosen.

6. A wagering system as claimed in claim 5, wherein the particular wagering formats include 6-digit lotto, 3-digit lotto, 4-digit lotto and keno.

7. A wagering system as claimed in claim 5, wherein the particular wagering formats include intrastate wagering and interstate wagering.

8. A wagering system as claimed in claim 5, wherein the particular wagering formats include Quick Pick option.

9. A wagering system for accepting wagers over the telephone comprising:

a) automatic call director means (ACD) for receiving incoming calls from subscribers who wish to wager on the system;

b) voice responsive means (wagering VRU) connected thereto for receiving the incoming calls routed from the ACD, for playing a series of recorded audio messages requesting subscriber wager information to be input via telecommunication means, for playing an associated series of audio messages requesting confirmation of the subscriber wager information, and for playing an audio confirmation message with an associated ticket number assigned to the wager; and c) host processor means having storage means and being connected to the wagering VRU for receiving the subscriber wager information, comparing it to a master subscriber enrollment file to validate it, storing it in a master subscriber wager file in the storage means, and assigning the associated ticket number to the wager.

10. A wagering system as claimed in claim 9, wherein the subscriber wager information includes a personal account number, a personal identification number, a particular wagering format chosen from a plurality of wagering formats available, at least one wager and a wagering amount corresponding to the particular wagering format chosen.

11. A wagering system as claimed in claim 9, wherein the particular wagering formats include 6-digit lotto, 3-digit lotto, 4-digit lotto and keno.

12. A wagering system as claimed in claim 9, wherein the particular wagering formats include intrastate wagering and interstate wagering.

13. A wagering system as claimed in claim 9, wherein the particular wagering formats include Quick Pick option.

14. Lottery wagering system comprising:
   a) automatic call director means (ACD) for receiving incoming enrollment calls from subscribers who wish to enroll with the system, and for receiving incoming wagering calls from subscribers who wish to wager on the system;
   b) first voice responsive means (enrollment VRU) connected thereto receives the enrollment calls routed from the ACD, for playing a series of recorded messages requesting subscriber enrollment information to be input via telecommunications means;
   c) second voice responsive means (wagering VRU) connected thereto for receiving the wagering calls from the ACD, and for playing a series of recorded audio messages requesting subscriber wager information to be input via telephone means; and
   d) host processor means having storage means and being connected to the enrollment VRU and wagering VRU, for receiving the subscriber enrollment information from the enrollment VRU and storing it in a master subscriber enrollment file in the storage means, and for receiving the subscriber wager information, storing it in a master subscriber lottery wager file in the storage means, and assigning an associated lottery ticket number to the wager.

15. A wagering system as claimed in claim 14, wherein the wager VRU plays an audio confirmation message with an associated ticket number assigned to the wager.

16. A wagering system as claimed in claim 14, wherein the wager VRU plays an associated series of audio messages requesting confirmation of the subscriber wager information.

17. A wagering system as claimed in claim 14, wherein the host validates the subscriber wagering information by comparing it to the master subscriber enrollment file.

18. A wagering system as claimed in claim 14, wherein the enrollment VRU plays an associated series of audio messages requesting confirmation of the subscriber enrollment information.

19. A wagering system as claimed in claim 14, wherein the subscriber enrollment information includes a credit card selection corresponding to one of a plurality of credit card companies, and a credit card number associated with the credit card selection.

20. A wagering system as claimed in claim 14, wherein the subscriber wager information includes a personal account number, a personal identification number, a particular wagering format chosen from a plurality of wagering formats available, at least one wager and a wagering amount corresponding to the particular wagering format chosen.

21. A wagering system as claimed in claim 20, wherein the particular wagering formats include 6-digit lotto, 3-digit lotto, 4-digit lotto and keno.

22. A wagering system as claimed in claim 20, wherein the particular wagering formats include intrastate and interstate wagering.

23. A wagering system as claimed in claim 20, wherein the particular wagering formats includes a Quick Pick option.

24. A wagering system for accepting wagers over the telephone comprising:
   a) automatic call director means (ACD) for receiving incoming enrollment calls from subscribers who wish to enroll with the system, and for receiving incoming wagering calls from subscribers who wish to wager on the system;
   b) first voice responsive means (enrollment VRU) connected thereto receives the enrollment calls routed from the ACD, for playing a series of recorded messages requesting subscriber enrollment information to be input via telecommunications means;
   c) voice responsive means (wagering VRU) connected thereto for receiving the incoming calls routed from the ACD, for playing a series of recorded audio messages requesting subscriber wager information to be input via telecommunication means, for playing an associated series of audio messages requesting confirmation of the subscriber wager information, and for playing an audio confirmation message with an associated ticket number assigned to the wager; and
   d) host processor means having storage means and being connected to the wagering VRU for receiving the subscriber wager information, comparing it to a master subscriber enrollment file to validate it, storing it in a master subscriber wager file in the storage means, and assigning the associated ticket number to the wager.

25. A wagering system as claimed in claim 24, wherein the enrollment VRU plays an associated series of audio messages requesting confirmation of the subscriber enrollment information.

26. A wagering system as claimed in claim 24, wherein the subscriber enrollment information includes a credit card selection corresponding to one of a plurality of credit card companies, and a credit card number associated with the credit card selection.

27. A wagering system as claimed in claim 24, wherein the subscriber wager information includes a personal account number, a personal identification number, a particular wagering format chosen from a plurality of wagering formats available, at least one wager and a wagering amount corresponding to the particular wagering format chosen.

28. A wagering system as claimed in claim 27, wherein the particular wagering formats include 6-digit lotto, 3-digit lotto, 4-digit lotto and keno.

29. A wagering system as claimed in claim 27, wherein the particular wagering formats include intrastate wagering and interstate wagering.

30. A wagering system as claimed in claim 27, wherein the particular wagering formats include Quick Pick option.

31. Lottery wagering system comprising:
   a) automatic call director means (ACD) for receiving incoming enrollment calls from subscribers who wish to enroll with the system and incoming wagering calls from subscribers who wish to wager with the system;

b) first voice responsive means (enrollment VRU) connected thereto for receiving the enrollment calls routed from the ACD, for playing a series of recorded audio messages requesting subscriber enrollment information to be input via telephone means, the subscriber enrollment information including a credit card selection corresponding to one of a plurality of credit card companies, and a credit card number associated with the credit card selection, and for playing an associated series of audio messages requesting confirmation of the subscriber enrollment information;

c) second voice responsive means (wagering VRU) also connected thereto for receiving the wagering calls routed from the ACD, for playing a series of recorded audio messages requesting subscriber wager information to be input via telephone means, the subscriber wager information including a personal account number, a personal identification number, a particular lottery game format chosen from a plurality of lottery game formats available, lottery numbers and a wagering amount for the particular lottery game chosen, for playing an associate series of audio messages requesting confirmation of the subscriber wager information, then for playing an audio confirmation message with an associated lottery ticket number assigned to the lottery wager; and d) host processor means having storage means and being connected to both the enrollment VRU and the wagering VRU, for receiving the subscriber enrollment information routed from the enrollment VRU and storing it in a master subscriber enrollment file in the storage means, and for receiving the subscriber wager information, comparing it to a master subscriber enrollment file to validate it, storing it in a master subscriber lottery wager file in the storage means, and assigning to it the associated lottery ticket number for the wager.

32. A wagering system as claimed in claim 31, wherein the particular wagering formats include 6-digit lotto, 3-digit lotto, 4-digit lotto and keno.

33. A wagering system as claimed in claim 32, wherein the particular wagering formats include intrastate wagering and interstate wagering.

34. A wagering system as claimed in claim 32, wherein the particular wagering formats include Quick Pick option.

* * * * *